United States Patent [19]

Krampe et al.

[11] 4,379,325
[45] Apr. 5, 1983

[54] SYSTEM FOR BRIDGING BRIEF NETWORK FAILURES

[75] Inventors: Dietrich Krampe, Neukirchen/Brand; Hans-Peter Schneider, Herzogenaurach; Hans-Hermann Zander, Erlangen, all of Fed. Rep. of Germany

[73] Assignee: Siemens Aktiengesellschaft, Munich, Fed. Rep. of Germany

[21] Appl. No.: 284,981

[22] Filed: Jul. 20, 1981

[30] Foreign Application Priority Data

Aug. 1, 1980 [DE] Fed. Rep. of Germany ....... 3029358

[51] Int. Cl.$^3$ .......................... H02J 3/36; H02H 7/12
[52] U.S. Cl. ...................................... 363/35; 363/37; 363/51; 318/803; 318/808
[58] Field of Search ................................. 363/34–35, 363/37, 50–58, 137, 96; 318/798, 800–803, 807–808

[56] References Cited

U.S. PATENT DOCUMENTS

| | | | |
|---|---|---|---|
| 3,560,834 | 2/1971 | Studtmann | 363/37 |
| 3,796,935 | 3/1974 | Blaschke | 318/801 |
| 3,887,853 | 6/1975 | Klein et al. | 318/801 |
| 4,139,885 | 2/1979 | Overzet et al. | 363/37 X |

Primary Examiner—William M. Shoop
Assistant Examiner—Peter S. Wong
Attorney, Agent, or Firm—Kenyon & Kenyon

[57] ABSTRACT

An arrangement for bridging brief network failures in intermediate-link converters converts the kinetic energy in load motors into electrical energy by reducing the frequency of the converter. Such a frequency reduction is performed in accordance with the value of a control deviation signal corresponding to the difference between desired and actual frequencies of operation of the converter. The control deviation signal is produced by the combination of a PI controller which is coupled at its output to an integrator circuit. The integrator circuit controls the frequency and voltage of the converter.

4 Claims, 1 Drawing Figure

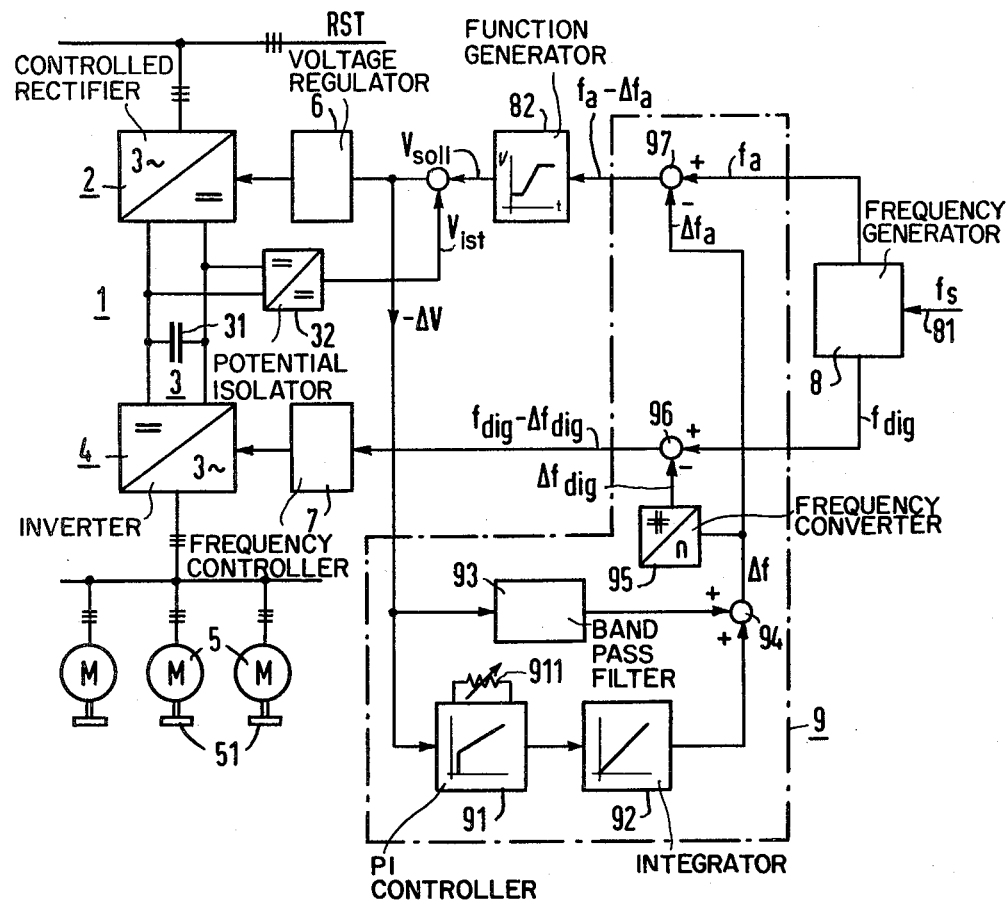

SYSTEM FOR BRIDGING BRIEF NETWORK FAILURES

BACKGROUND OF THE INVENTION

This invention relates generally to systems for bridging network failures in intermediate voltage converters, and more particularly, to a system wherein brief network failures are bridged by reconverting kinetic energy which is stored in load motors into electrical energy by lowering the frequency of the intermediate voltage converter.

As used herein, intermediate voltage converters are understood to mean converters of the type which contain controlled rectifiers, or DC control elements, in their inputs. Moreover, such intermediate voltage converters may be provided with pulse width-modulated inverter control.

In several known machines, illustratively of the type which are used in the chemical fiber and glassware industries, machine operation must be maintained continuously even in the event of a brief network failure. It is particularly essential that the drives which are supplied electrical energy by the intermediate voltage converters do not become desynchronized during the period of the network failure.

U.S. Pat. No. 3,705,340 describes an illustrative known system which is provided with a capacitor buffer in the intermediate converter for energy bridging in the event of brief network failures. The system described therein is capable of bridging network failures which have a duration in excess of 500 milliseconds. Although such buffer arrangements have proven themselves to be praticable, it is a disadvantage of such systems that the intermediate converter voltage may be decreased by only a small amount during a network failure before the motors supplied thereby reach their stalling torque. Moreover, such capacitive storage systems are relatively expensive.

Network failures of longer duration may be advantageously bridged by kinetic buffering systems which, for example, contain a corotating generator connected to the network, or by utilizing the kinetic energy stored in the driven motors and the load. A technical prerequisite for such kinetic energy storage systems is that the work-performing machine and its drive system, must have a substantial moment of inertia. Moreover, means must be provided for lowering the frequency of the system during network failure.

British Pat. No. 1,085,520 illustrates a prior art arrangement wherein the frequency of the system is lowered in accordance with a predetermined time function. This system, however, has the disadvantage that the empirically determinable lowering of the frequency produces impermissible conditions if the moment of inertia changes, such as by switching the motors on and off. In arrangements wherein the motor speeds are controlled at different speed levels, the coupling of the generator feedback must be precise. For example, if the generator feedback of the motors is too light, the converter will be disconnected for lack of energy. On the other hand, if the generator feedback is too heavy, there is presented a danger of energy overloading which may cause the converter to be shutdown by its protective devices. As a result of these disadvantages, kinetic buffering cannot be widely used.

It is, therefore, an object of this invention to provide a kinetic buffering system which operates reliably over a wide range of network failure periods.

SUMMARY OF THE INVENTION

The foregoing and other objects are achieved by this invention which provides a kinetic system for bridging brief network failures wherein the kinetic energy of the inertial mass in the load motors is reconverted into electrical energy by lowering the frequency of an intermediate voltage converter. A controller arrangement is provided for continuously decreasing the control frequency of the intermediate voltage converter so as to reduce the difference between first and second signals which correspond to the desired and actual frequencies of operation, respectively, of the intermediate voltage converter. This permits a stable control circuit to be constructed wherein the kinetic energy of the load machinery is returned to the intermediate voltage converter in a controlled manner, because the controlled reduction of the frequency of the intermediate voltage converter causes oversynchronous operation of the load motors.

The controller arrangement advantageously produces a frequency reduction which is selected to be somewhat smaller than the frequency reduction which would be required to achieve equalization. The frequency reduction selected by the controller arrangement is proportionally offset from the equalization frequency. In this manner, electrical energy which is stored in a capacitor of the intermediate voltage converter is proportionally utilized during a network failure. The additional energy which is provided by the capacitor reduces the need for large reductions in converter frequency during a network failure.

In one advantageous embodiment of the invention, the circuitry of the controller arrangement is arranged as a PI controller which is coupled at its output to an integrator which generates a value corresponding to the required frequency correction of the operating frequency of the converter. A band-pass filter is connected in shunt across the PI controller and the integrator so as to damp the control system during a network failure.

BRIEF DESCRIPTION OF THE DRAWING

Comprehension of the invention is facilitated by reading the following detailed description in conjunction with the annexed drawing which shows a block and schematic representation of an intermediate voltage converter, constructed in accordance with the principles of the invention.

DETAILED DESCRIPTION

The FIGURE shows an intermediate voltage converter 1 connected to a three-phase network RST which, in one embodiment, may supply 380 volts at 50 hertz to a plurality of asynchronous or synchronous motors 5. Motors 5 are mechanically coupled to loads 51, the loads having moments of inertia. In this embodiment, the output frequency of converter 1 is advantageously adjustable to be between 50 and 500 hertz.

Converter 1 is provided with a controlled rectifier 2 which is coupled to a DC voltage intermediate link 3 having an intermediate link capacitor 31. An inverter 4, which may be a free-running converter, is connected in parallel with capacitor 3. A potential isolator 32 is coupled at its input to the output of controlled rectifier 2, and provides at its output a DC voltage $V_{ist}$ which is conducted to a voltage regulator 6. Voltage regulator 6 is coupled at its output to a control terminal of controlled rectifier 2, so as to level out the voltage of the converter.

The output frequency of inverter 4 is determined by a frequency controller 7. A digital control frequency $f_{dig}$ which is provided to frequency controller 7 is generated by a frequency generator 8, which may contain analog or digital circuitry. Frequency generator 8 is provided at an input terminal 81 with a desired frequency $f_s$, which may be in the form of an analog signal produced illustratively by potentiometers, or in the form of binary signals, which may be produced by decade switches. A frequency-proportional analog signal $f_a$ is produced by frequency generator 8 in response to the desired frequency signal $f_s$. The frequency proportional signal $f_a$ functions as a control variable so as to provide a desired value $V_{soll}$ to voltage regulator 6 via a function generator 82. This arrangement permits the voltage to be varied in accordance with variations in the reference value of the frequency. The relationship between the voltage and the frequency (the ratio V/f) is a function of the circuitry in function generator 82.

The kinetic energy state of the production machinery is determined by the sum of the moments of inertia of motors 5 and loads 51. The individual motors 5 run at synchronous or asynchronous speeds, depending upon their respective numbers of pole pairs in proportion to the frequency of the electrical energy provided by the converter. A sufficient amount of torque-forming magnetic flux in the motors is ensured throughout the range of frequencies of the converter by operation of the frequency-proportional voltage supply. If the network fails, the speeds of motors 5 can be made to be oversynchronous by a controlled reduction of the converter frequency. In this manner, the motors operate as generators which supply sufficient energy to continue the work process, and overcome their own losses and the losses in the converter.

During a network failure, inverter 4 is decoupled from the defective network via intermediate link 3 and its associated capacitor 31. A bucking voltage which is required to operate motors 5 as generators is provided across capacitor 31 during network failures. The magnitude of the intermediate link voltage corresponds proportionally to the output voltage of the inverter, and reflects the energy equilibrium between demand and supply. In other words, for an illustrative operating point where; f=100 Hz, and V=500 V, the energy budget is balanced if the voltage/frequency ratio of 5 volts per hertz is preserved as the frequency is lowered.

In some embodiments of the invention, illustratively in installations wherein the motors operate chemical fiber equipment, the operating parameters of the installation, including the moments of inertia of the machinery, the speed at which the machinery is driven, and the permissible range of adjustment permit buffer times in the order of seconds. Thus, network failure times of more than 500 milliseconds can be bridged without difficulty if the speed of the machinery is lowered in the order of 1%.

In order to eliminate the effects of different moments of inertia and speeds of the machinery in the installation, the frequency variations must be performed in a controlled manner, depending upon the energy budget in the DC voltage intermediate link. Thus, in the event that the actual voltage in the intermediate link, with respect to a predetermined value, is decreased, the frequency must also be decreased to the extent that the energy budget is balanced. Such control is achieved by the circuitry contained within a dashed frame 9. Such circuitry consists essentially of a PI controller 91 which receives at its input a signal corresponding to the control deviation $\Delta V$, which corresponds to the difference between the desired value $V_{soll}$ and the actual value of the intermediate link voltage $V_{ist}$. In some embodiments, the corresponding intermediate link voltages can be replaced by the output voltages of inverter 4 which differ from the voltage in the intermediate link by a predeterminable factor. PI controller 91 is coupled at its output to an integrator 92 which is coupled through an adder stage 94 to a frequency converter 95. Frequency converter 95 produces at its output a signal corresponding to a frequency correction value $\Delta f_{dig}$. This value is combined in a pulse mixing gate 96, which may be constructed in a known manner from ring counters, with the digitally set control frequency $f_{dig}$. The associated frequency-proportional value $f_a$ is corrected by a value $\Delta f_a$, and the desired voltage $V_{soll}$ is accordingly lowered.

A band-pass filter 93 is connected in shunt across controller 91 and integrator 92, to damp the control loop. The output signal of band-pass filter 93 is combined with the output signal of integrator 92 in an adder stage 94.

The circuitry contained in circuit arrangement 9 operates as follows:

After the occurrence of a network failure, free-running inverter 4 initially continues to operate with its frequency unchanged. This causes intermediate link 3 to become discharged so as to produce a deviation $\Delta V$ which is provided at the input of controller 91. Controller 91 operates as a df/dt so as to produce at its output a signal corresponding to the rate of change of frequency. Correction value $\Delta f$ is formed in integrator 92 and is provided to pulse mixing gate 96 in such a polarity that the frequency of the converter is lowered. Such a frequency reduction causes the motors to run oversynchronously, and thereby produce generator feedback into the intermediate link 3. Consequently, the intermediate link voltage is raised once again and the voltage/frequency ratio is stabilized in accordance with the value of the frequency-dependently reduced desired voltage $V_s$. This process is continuously repeated in a closed control loop, such that the frequency-lowering intervention is always performed in accordance with the principle of voltage balance, i.e., the balanced energy budget.

PI controller 91 is provided with a proportional offset 911 which provides a proportional feedback such that a proportional deviation is obtained between the actual voltage value and the desired voltage value. Thus, the voltage/frequency ratio is lowered during the frequency reduction. This has the effect of relieving the energy budget in the event of buffering so as to partially free the energy stored in intermediate link 3 and simultaneously reduce the magnitizing losses in motors 5. Upon the return of the network voltage after a failure, integrator 92 returns to its zero position, so that the inverter is operated at the original frequency.

Although the invention is disclosed in terms of specific embodiments and applications, persons skilled in the art, in light of this teaching, can generate additional embodiments without departing from the scope of the invention. Accordingly, it is to be understood that the drawing and descriptions in this disclosure are illustrative of the principles of the invention, and should not be construed to limit the scope thereof.

What is claimed is:

1. An arrangement for bridging a network failure, the arrangement being of the type wherein kinetic energy in load motors is reconverted into electrical energy by lowering the frequency of operation of a converter, the arrangement comprising:

controller means having an input for receiving a first voltage signal corresponding to the difference between desired and actual voltage values of the converter; and frequency converter means connected to said controller means for producing a frequency correction signal for lowering the frequency of operation and said associated desired voltage value of the converter whereby the load motors operate oversynchronously as generators to supply electrical energy to the converter during the network failure.

2. The arrangement of claim 1 wherein said controller means decreases the frequency of operation of the converter by an amount which is less than a frequency reduction which would be required to achieve equality between desired and actual frequencies of operation, said desired and actual frequencies of operation corresponding to said desired and actual voltages of the converter, respectively.

3. The arrangement of claim 1 wherein said controller means is designed as a PI controller, and there is further provided an integrator having an input terminal coupled to said controller means, for producing said frequency correction signal.

4. The arrangement of claim 3 wherein there is further provided band-pass filter means connected in shunt across said controller means and said integrator for preventing instability during a network failure.

* * * * *